United States Patent
Osborn et al.

(10) Patent No.: US 7,438,663 B2
(45) Date of Patent: Oct. 21, 2008

(54) COMPOUND GEARING SYSTEM AND METHOD WITH CHAIN AND BELT ENGAGEMENT STRUCTURES

(75) Inventors: Merritt A. Osborn, Aurora, OH (US); Theodore Radisek, Aurora, OH (US)

(73) Assignee: Merritt Armstrong Osborn, Aurora, OH (US)

( * ) Notice: Subject to any disclaimer, the term of this patent is extended or adjusted under 35 U.S.C. 154(b) by 635 days.

(21) Appl. No.: 11/202,876

(22) Filed: Aug. 12, 2005

(65) Prior Publication Data

US 2006/0035739 A1 Feb. 16, 2006

Related U.S. Application Data

(60) Provisional application No. 60/679,583, filed on May 10, 2005, provisional application No. 60/601,016, filed on Aug. 12, 2004.

(51) Int. Cl. *F16H 57/08* (2006.01)
(52) U.S. Cl. ........................ 475/344; 475/331
(58) Field of Classification Search .............. 474/155, 474/87, 164, 55, 156; 74/216.3, 360–518; 475/182–194, 231, 343, 331, 346, 344
See application file for complete search history.

(56) References Cited

U.S. PATENT DOCUMENTS

| 1,293,123 | A |   | 2/1919  | Konetsky |         |
|-----------|---|---|---------|----------|---------|
| 2,669,885 | A | * | 2/1954  | Fedri    | 475/167 |
| 3,108,488 | A |   | 10/1963 | Huszar   | 74/465  |
| 3,151,495 | A |   | 10/1964 | Kurtz    | 74/413  |
| 3,611,822 | A | * | 10/1971 | Sanderson | 474/109 |
| 3,968,704 | A |   | 7/1976  | Fogelberg |        |
| 3,975,969 | A | * | 8/1976  | Osborn et al. | 74/465 |
| 4,077,273 | A |   | 3/1978  | Osborn   | 74/415  |
| 4,307,630 | A |   | 12/1981 | Osborn et al. | 475/159 |
| 4,529,394 | A |   | 7/1985  | Ybern Miro |       |
| 4,545,778 | A |   | 10/1985 | Koivula  |         |
| 4,640,154 | A |   | 2/1987  | Osborn   | 475/178 |
| 4,701,093 | A |   | 10/1987 | Meyer    |         |
| 4,919,011 | A | * | 4/1990  | Kemp, Jr. | 475/183 |

(Continued)

OTHER PUBLICATIONS

International Search Report and Written Opinion of the International Searching Authority, dated Apr. 10, 2007, reapplication PCT/US2005/028580 of Osborn et al.

*Primary Examiner*—Lynda Jasmin
*Assistant Examiner*—Anna Momper
(74) *Attorney, Agent, or Firm*—Patrick J. Daugherty; Driggs, Hogg, Daugherty & Del Zoppo Co., LPA

(57) ABSTRACT

A compound gear system and method comprising a flexible gear defining an array of gear elements in an articulating relationship, a rigid structure defining first and second spaced parallel pluralities of articulating gear support structures arrayed in a ring, the articulating gear reeved tightly about and engaging the support structures, thereby restraining the flexible articulating gear from moving inwardly or rotationally relative to the rigid structure while enabling the flexible gear to expand outward, and at least one sprocket gear having a plurality of sprocket teeth aligned to engage flexible gear element middle areas. The support structures transmit torque between the flexible gear elements and the rigid structure responsive to interaction of the flexible gear element middle areas with the sprocket gear teeth.

12 Claims, 17 Drawing Sheets

U.S. PATENT DOCUMENTS

| | | | |
|---|---|---|---|
| 5,080,638 A | 1/1992 | Osborn | 475/179 |
| 5,183,443 A * | 2/1993 | Murakami et al. | 475/168 |
| 5,360,380 A * | 11/1994 | Nottle | 475/182 |
| 5,456,638 A | 10/1995 | Osborn | 475/155 |
| 2004/0162175 A1 * | 8/2004 | Ai | 475/183 |
| 2005/0064977 A1 * | 3/2005 | Oishi | 475/183 |

* cited by examiner

COMPOUND GEARING SYSTEM AND METHOD WITH CHAIN AND BELT ENGAGEMENT STRUCTURES

REFERENCE TO RELATED APPLICATIONS

This application claims the benefits of the following provisional patent applications previously filed in the United States Patent and Trademark Office by common inventors Merritt A. Osborn and Theodore Radisek: "COMPOUND GEARING SYSTEM AND METHOD WITH CHAIN PLATE SEAT STRUCTURES," filed Aug. 12, 2004, Ser. No. 60/601,016, Confirmation No. 1104; and "COMPOUND GEARING SYSTEM AND METHOD WITH CHAIN AND BELT ENGAGEMENT STRUCTURES," filed May 10, 2005, Ser. No. 60/679,583, Confirmation No. 4239.

BACKGROUND ART

The use of flexible and articulating gear components such as roller chain, "silent chain" and cog belts within compound gearing systems is well known. One common and well-known application involves connecting two sprocket gears with a roller chain in order to translate force from one sprocket to the other. Roller chain compound gearing efficiently transmits power through the rolling action of the chain rollers during engagement with gear tooth contact, providing frictional advantages over gear tooth-to-gear tooth contact. Roller chain also provides shock resistance accommodation to fluctuating input forces or speeds through expanding and contracting or acting like a spring, thereby providing a means for avoiding responsive damage to the gearing system. Roller chain also provides lubrication system advantages through greater tolerances for accepting a wide variety of lubrications, and will maintain lubrication and run without a case.

Use of a precision roller chain as a ring gear within planetary and epicyclic speed reduction and torque transmission systems has been in use for some time. This application typically requires that the roller chain be fixed to a round or cylindrical solid element in order to align the roller chain into a ring configuration and provide a structural means to receive and transfer forces and speeds. It is common to accomplish this by using a double strand of roller chain, with one of the strands dedicated to form a fixed engagement with a structural element, and the second strand aligned to engage an input or output toothed gearing element, wherein interaction with the gearing element is thereby translated to the structural element. For example, U.S. Pat. No. 3,151,495 to Kurtz and U.S. Pat. No. 3,975,969 to Osborn show various configurations where toothed support members are provided to engage the rollers of a first strand of a twin stranded chain. The first strand is reeved about toothed solid cylindrical elements, the teeth designed to firmly engage the first strand and thereby hold it into a fixed position with respect to the cylindrical element. A second strand engages a second toothed gear or gears, such as a set of planetary sprockets driven by a central sun gear.

One disadvantage with this system is that a single set of planetary sprockets requires a double strand chain ring gear, resulting in space and material inefficiencies. Also, since the support of the roller chain is essentially completely on the rollers of the first strand of the chain, there is a strong propensity of the double chain assembly to cant or tilt when subject to pressure, thus causing the unsupported strand of the chain to be skewed and have less than optimal engagement with the tooth gear member which it is engaging. The greater the pressure on the cantilevered strand, the more detrimental this effect is. Indeed, this is especially detrimental when there is a third strand or chain which engages a third toothed gear.

Another drawback of this configuration is that the first strand rollers engaging the teeth on the support member are not available to mesh with teeth on the second gear, thus requiring a cantilevered structure of at least two strands of chain, one of the strands being engaged on the teeth of the support member, with other, cantilevered strands acting as the meshing device for the tooth gear engagement. Expressed another way, it is not possible to use a single-strand link chain for engaging a single set of planetary sprocket teeth, but rather a chain of at least two strands is required.

It is also known to form a composite internal gear element wherein a single strand of chain is reeved around a disk in a circular arrangement, with the chain link plates supported by the cylindrical outer surface of the disk, while the rollers clear the center or periphery of the disk and are, thus, available for engagement with sprocket teeth on the outside periphery of the roller chain. Huszar (U.S. Pat. No. 3,108,488) teaches a clamp that squeezes the chain and, therefore, chain links against the smooth outer cylindrical surface at the periphery of the disk, with a second or toothed gear engaging the single reeved strand of chain at an external circumference point for gear action, thus permitting external gearing. However, a significant disadvantage of the embodiments taught by Huszar is that they rely solely on friction to hold the chain on a smooth surface to engage the chain with the support member and, under even moderately heavy loads, there tends to be significant slippage, which for many applications is unacceptable. Additionally, this configuration does not allow for internal gearing, such as that provided for by the Osborn '969 and Kurtz devices described above.

Moreover, in this configuration of Huszar, it is extremely difficult to obtain the proper tension on the chain. Too little tension will not result in any significant gripping, and too much will stress the chain beyond its elastic limit, thus causing reduced gripping and out of tolerance parts.

Another patent to Osborn, U.S. Pat. No. 5,456,638, teaches a roller chain reeved about a generally circular disk having a pair of circumferentially-extending spaced link plate receiving grooves. By supporting the roller chain through contact with the chain link plates, a second toothed gear may freely and drivingly engage the chain rollers through engagement at the external circumference of the reeved chain. However, the issue of slippage of the reeved chain with respect to the disk requires additional retaining structures to hold the chain in a fixed position during operation of the device. Embodiments taught include a pin that extends from the exterior of the disk between a pair of rollers to engage the rollers, and a retaining plate device which extends from a flange on the disk between a pair of link plates. And, moreover, if pins are utilized extending between certain of the rollers, the space between the rollers is not available for driving an external connection of a toothed gear and, hence, a double or other multiple-strand chain must be utilized with one strand engaging the disk and the other strand or strands being available to engage a toothed gear.

What is needed is a compound gear that provides the advantages of chain components such as roller chain, "silent chain" and cog belts without the disadvantages of chain cantilevering or skewing responsive to uneven loading across the chain. It is also desired to improve space and material efficiencies by forming a compound chain gear which does not require a first chain strand to engage a support member, thus requiring at least two strands to engage one toothed gear or set of gears. And, lastly, what is needed is an efficient compound roller chain gear wherein each strand of roller chain may be engaged either internally or externally by another gear element.

SUMMARY OF THE INVENTION

A compound gear system and method comprising a flexible gear defining an array of gear elements in an articulating relationship, a rigid structure defining first and second spaced parallel pluralities of articulating gear support structures arrayed in a ring, the articulating gear reeved tightly about and engaging the support structures, thereby restraining the flexible articulating gear from moving inwardly or rotationally relative to the rigid structure while enabling the flexible gear to expand outward, and at least one sprocket gear having a plurality of sprocket teeth aligned to engage flexible gear element middle areas. The support structures transmit torque between the flexible gear elements and the rigid structure responsive to interaction of the flexible gear element middle areas with the sprocket gear teeth.

DESCRIPTION OF EMBODIMENTS OF THE INVENTION

The present invention teaches a system and method for designing compound chain gears. In one embodiment of the present invention described below, an internal compound ring gear formed with a single strand of roller chain is used within a planetary gear head, with a set of planetary sprockets and a solid sun driver with cylindrical tooth forms. In another embodiment, a fixed roller pin ring gear is provided. And other embodiments using "silent chain" ring gears and cog belts are also described. However, the invention may be practiced within many other types of gearing systems, and may also be used with multiple strands of chain components, and is not limited to planetary applications or to the specific embodiments described herein. What is important in the present invention is that a single strand chain component or single pin roller array within a gearing system may form a working engagement with one gear element while maintaining unimpeded gear tooth-roller engagement with a second gear element.

Figure 1A:
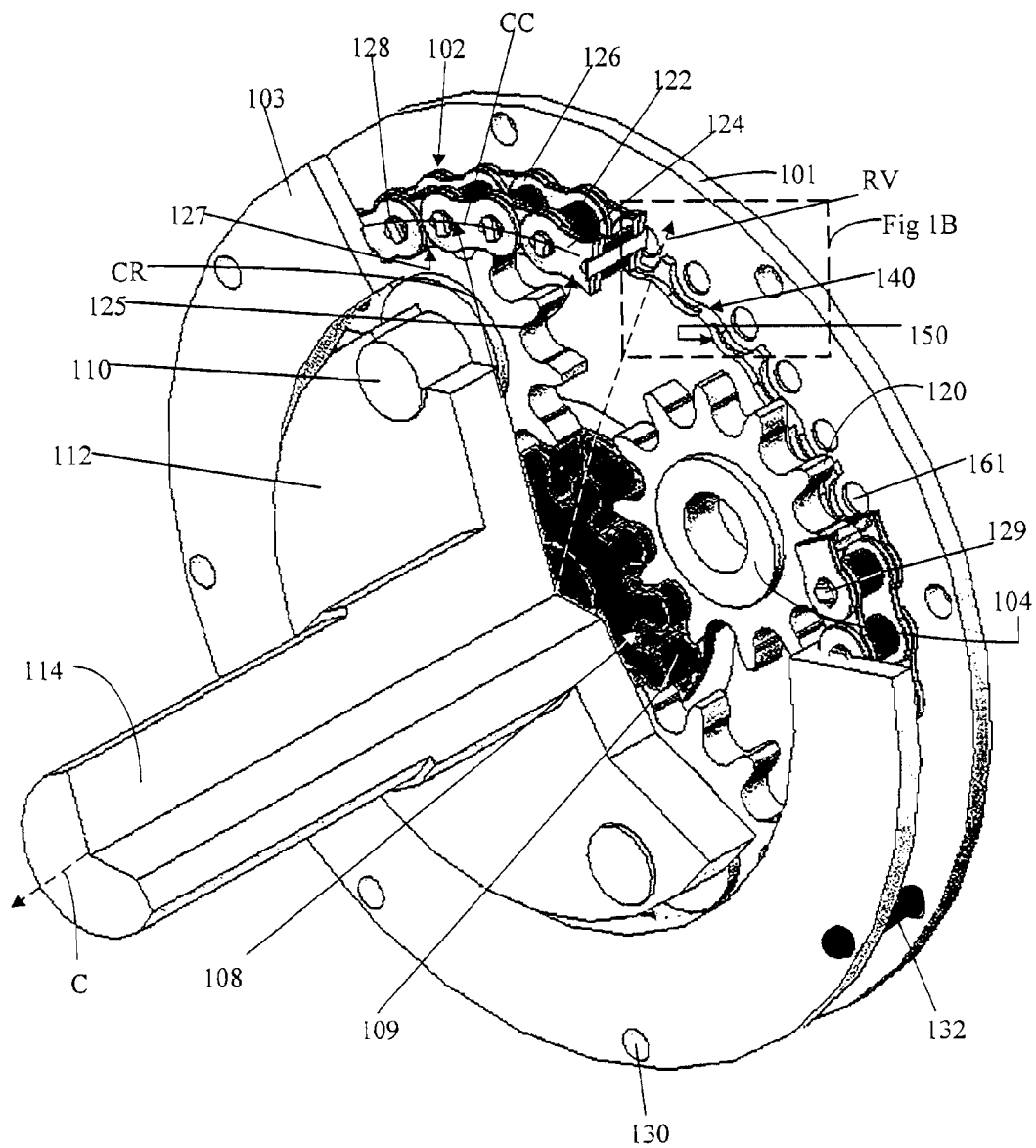
FIG. 1A is a perspective and partially sectional view of a gear set utilizing a composite gear system and method according to the present invention.
Figure 1B:
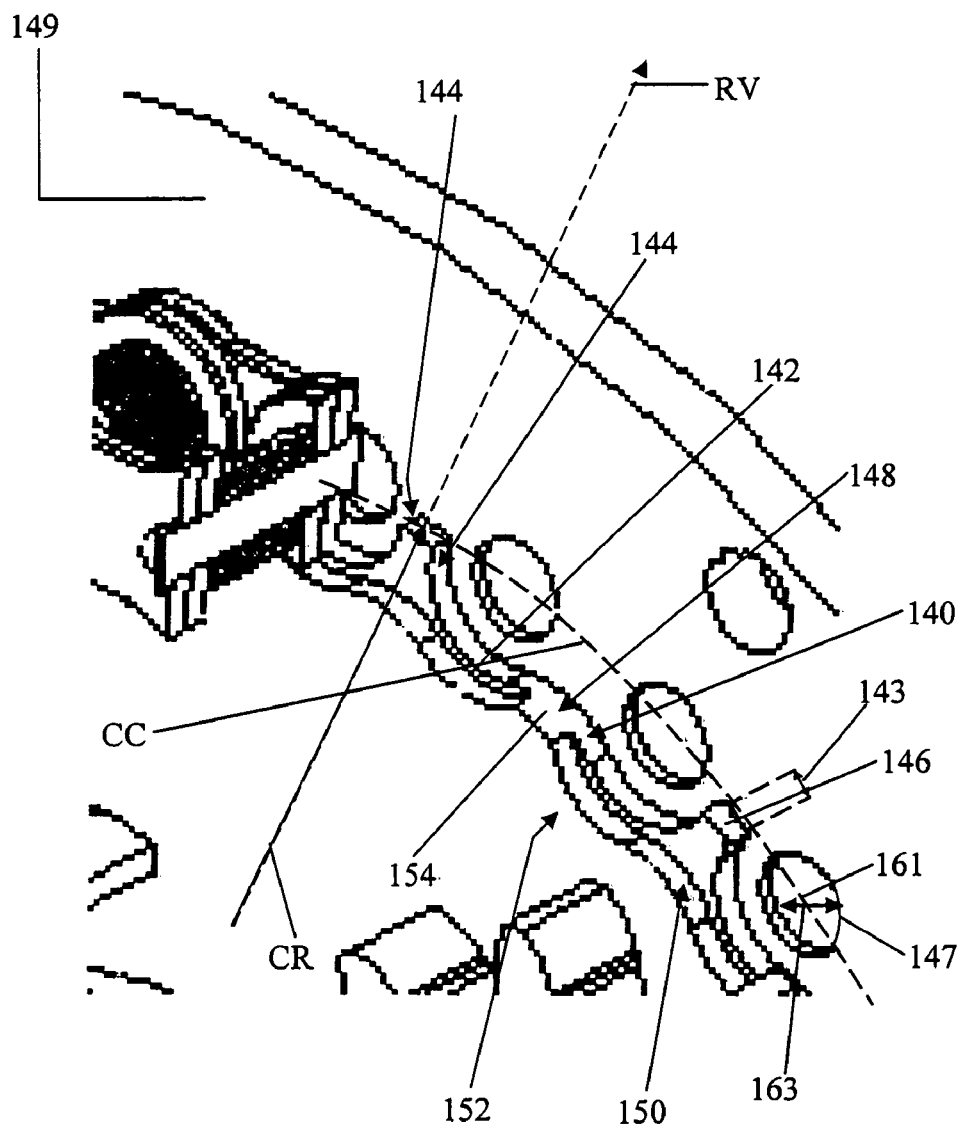
FIG. 1B is a detail view of a portion of the composite gear system of FIG. 1A.
Figure 1C:
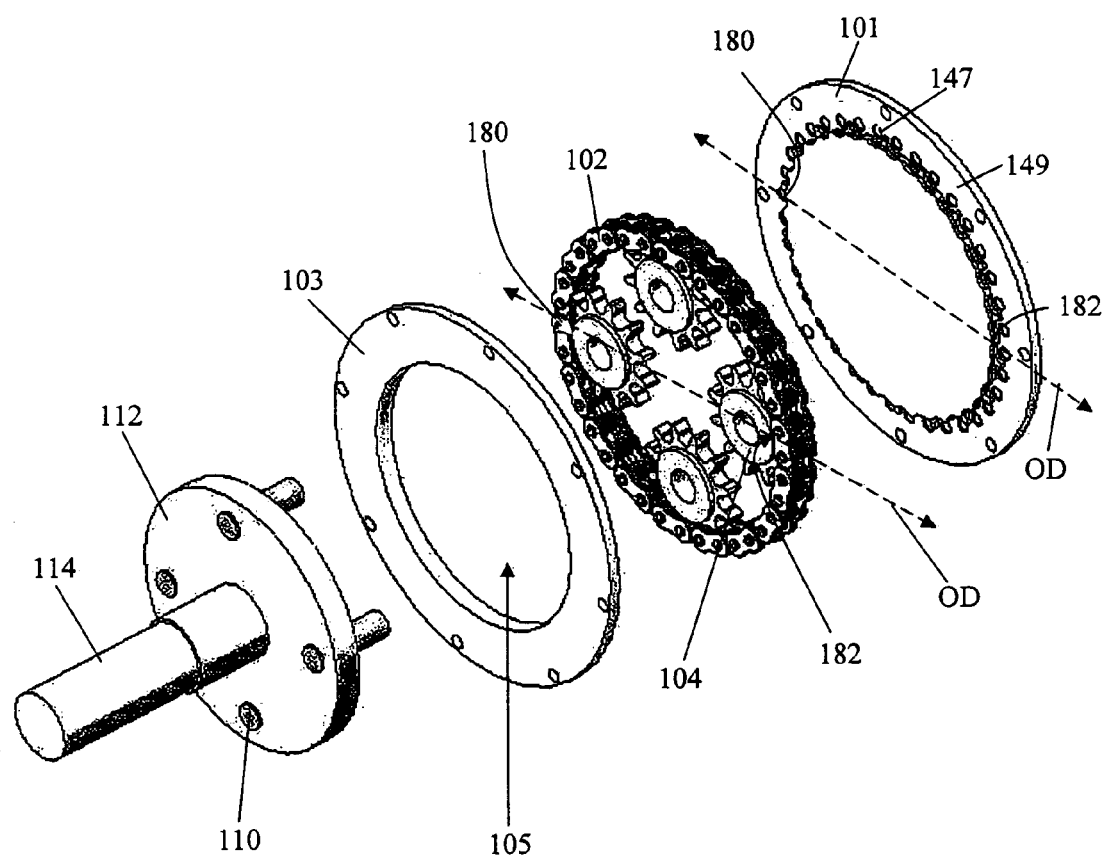
FIG. 1C is an exploded view of some of the components of the composite gear system of FIG. 1A.
Figure 1D:
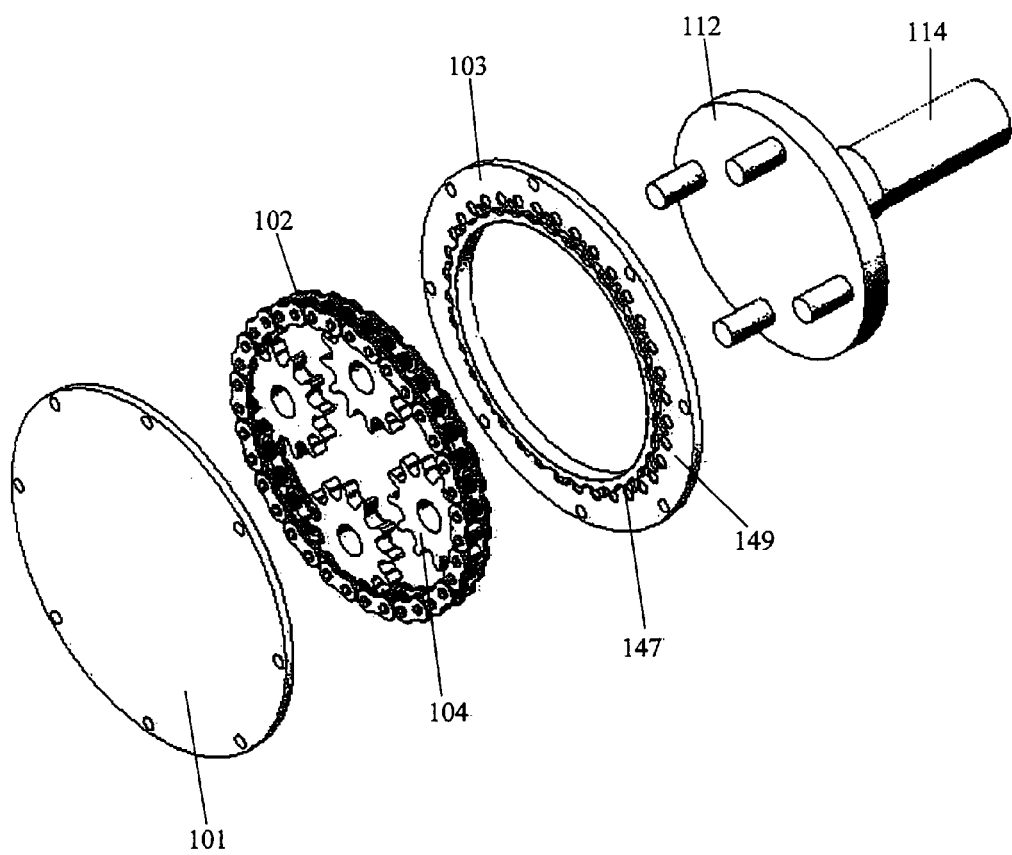
FIG. 1D is another exploded view of some of the components of the composite gear system of FIG. 1A.
Figure 2A:
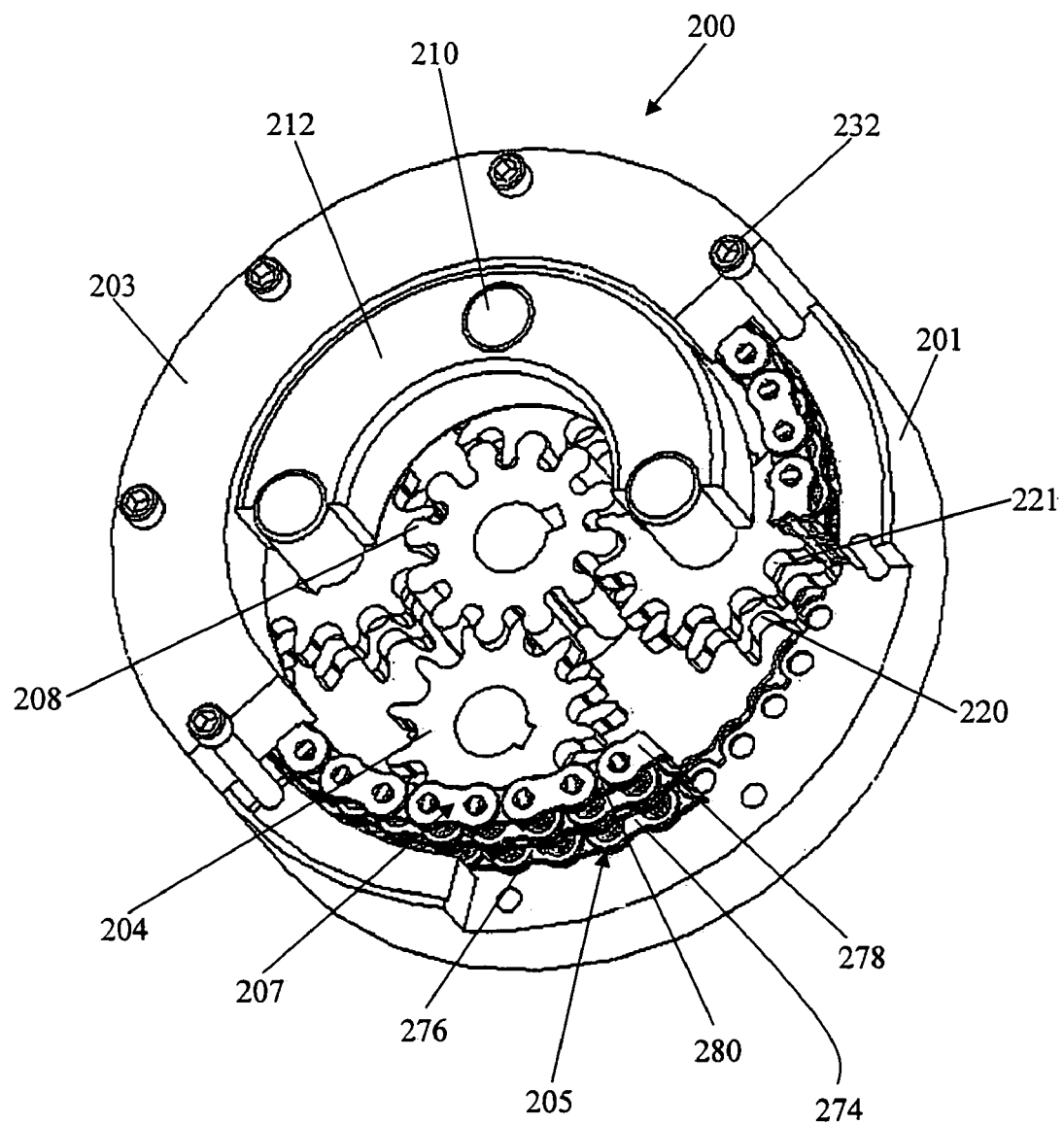
FIG. 2A is a perspective and partially sectional view of another gear set utilizing a composite gear system and method according to the present invention.
Figure 2B:
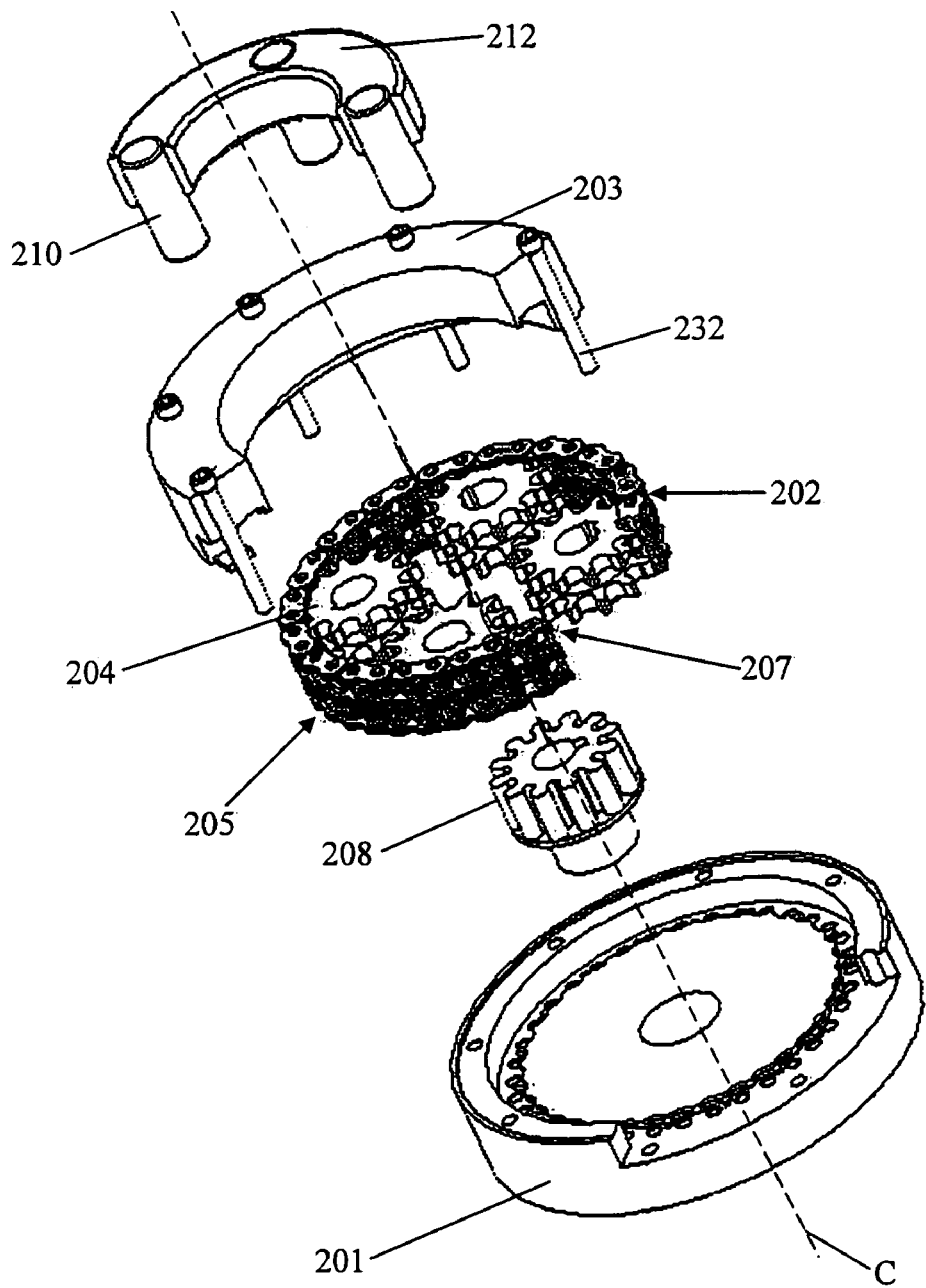
FIG. 2B is an exploded view of the composite gear system of FIG. 2A.
Figure 2C:
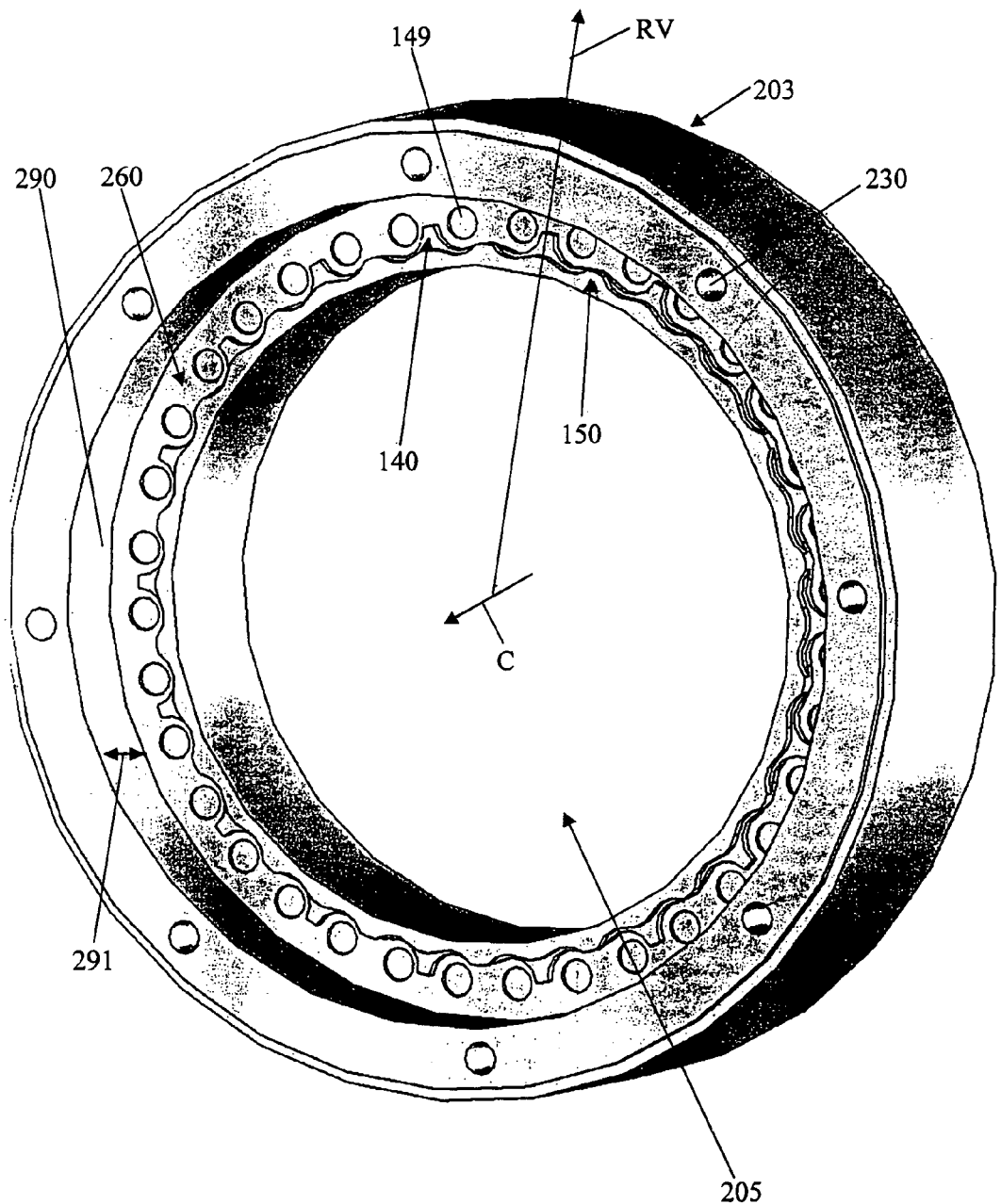
FIG. 2C is a perspective view of one of the elements of the composite gear system of FIG. 2A.
Figure 2D:
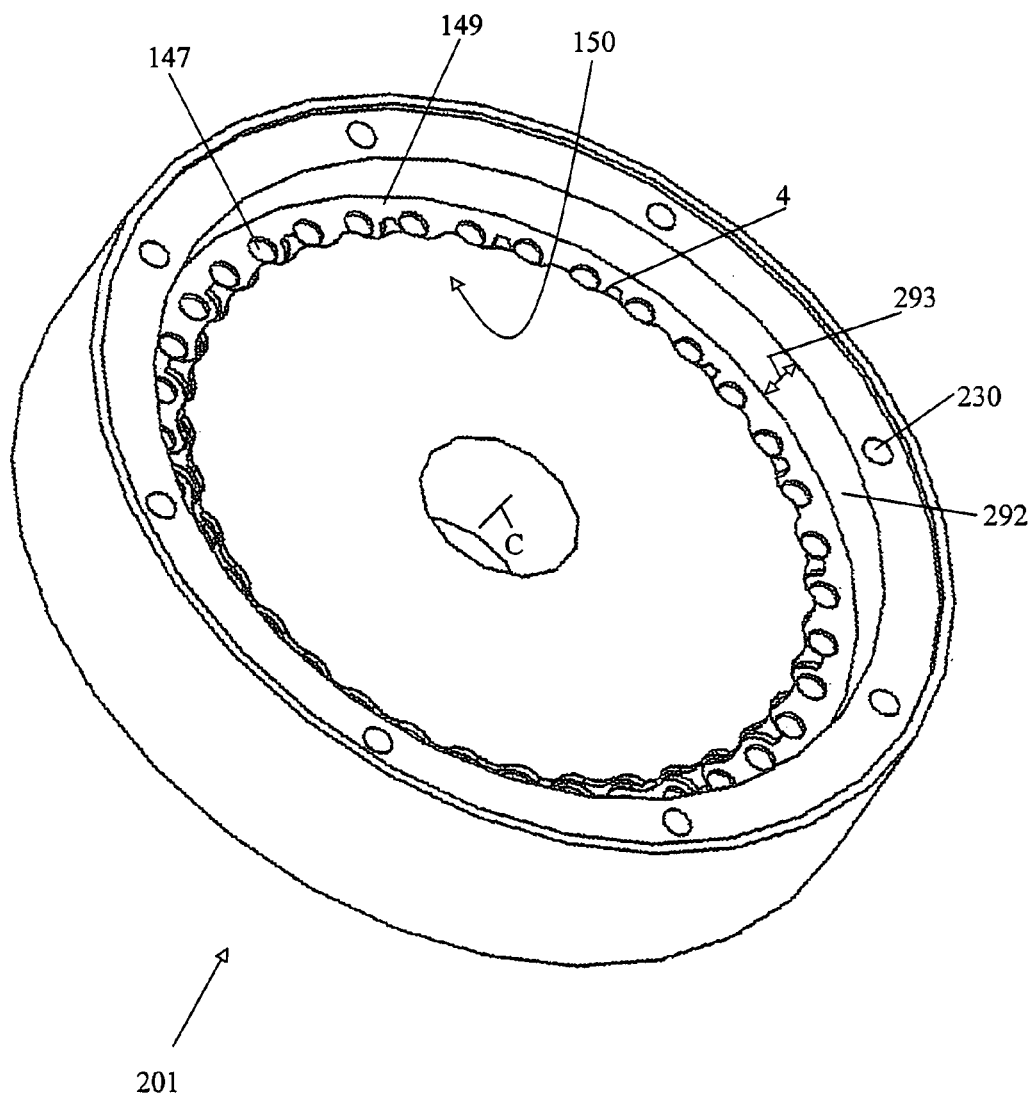
FIG. 2D is a perspective view of another of the elements of the composite gear system of FIG. 2A.

Referring now to FIGS. 1A through 1B, a composite planetary gearing system 100 is illustrated. Gear teeth 109 on a sun input driving gear 108 drive four circumferentially spaced planetary sprockets 104 through interaction with their sprocket teeth 120. Each of the planetary sprockets 104 rotates about one of four circumferentially spaced pins 110, the pins fixed into an output disc body 112 formed at the end of an output shaft 114. As the planetary sprockets 104 are rotated by the driving gear 108, they responsively travel along an inner ring gear 102 formed by a single strand precision roller chain through interaction of the sprocket teeth 120 with the chain strand rollers 122. The output disc body 112 is located and freely rotates within a circular aperture 105 defined by a ring gear annular disc 103. The roller chain 102 is located between and fixed in position with respect to the annular disc 103 and a ring gear circular plate 101, as will be described presently below. The circular plate 101 and annular disc 103 further define mounting apertures 130 for connections to other structural elements, such as the geared case housing (not shown) or an input motor casing (not shown). The apertures 130 may also be used for connective bolt elements 132 to connect the circular plate 101 and annular disc 103 into a fixed structure about the chain gear 102.

As the ring gear 102 is fixed in position relative to the circular plate 101 and annular disc 103, the traveling of the planetary sprocket teeth 120 along the chain rollers 122 responsively causes the sprockets 104 and their pins 110 to "orbit" about the central "sun" driver 108. The orbit of the pins 110 about the driver 108 thereby drives the output disc body 112 and output shaft 114 at a reduced speed and increased torque relative to the input driving gear 108. In another configuration (not shown), the circular plate 101 and annular disc 103 affixed to the chain ring gear 102 are instead fixed to an output structure, such as a shaft, with the sprocket pins 110/disc body 112 instead connected to a gear housing or other fixed structure; with similar roller chain 102, sun gear 108 and planetary gear 104, pitch count and diameters, different speed reduction and torque modification properties can be obtained.

What is new and important in the present invention is a system and method for fixing the roller chain ring gear 102 in position with respect to the circular plate 101 and annular disc 103. Link support structures are formed on the circular plate 101 and annular disc 103 for engaging the side plates of the roller chain to thereby hold the chain in a fixed position. What is additionally important is that the link support structures are also formed so that when they engage the chain 102 side plates, they are spaced from the chain rollers 122 and aligned to enable unimpeded access to the chain rollers 122 by the sprockets 104 from the inside circumference of the roller chain 102.

The roller chain gear 102 is a conventional roller chain with outer pin link plates 124 and inner roller link plates 126 connected by chain pins 128. As is conventional, the chain rollers 122 are mounted on bushings (not shown) on the pins 128. According to the present invention, first chain support structures 140 are formed on the circular plate 101 and annular disc 103 to mate with the outer pin link plates 124 of the roller chain 102 and, more specifically, with the bottom inner surface of the pin link plate 125 with respect to a central axis C common to the "sun" driver 108, circular plate 101, annular disc 103 and output shaft 114. Second chain support structures 150 are also formed on the circular plate 101 and annular disc 103 to mate with the inner roller link plates 126 of the roller chain 102 and, more specifically, with the bottom inner surface 127 of the roller link plates 126 with respect to the central axis C.

What is important is that the present invention utilizes the side plates 124 and 126 of a conventional precision roller chain to hold the chain in place as a ring or planet gear, thereby enabling unfettered access to the chain rollers 122 from the planetary sprocket teeth 120. It is preferred that the support structures 140 and 150 are formed as profiles substantially identical to those of portions of the bottom areas of the side plates 124 and 126, respectively, thereby utilizing the roller chain side plates both to transmit torque and to fix the roller chain into position with respect to the circular plate 101 and annular disc 103 by restraining the roller chain 102 from moving inwardly or rotationally with respect to the common center axis C.

The first support structure 140 is defined by a plurality of first supportive curved sidewall projections 142 that engage substantially the entire outer pin link plate surface 125 of each outer pin link plate 124 located within a chain array circle CC defined by the alignment of the center points 129 of the round chain pins 128 on a radius CR commonly aligned with the radius RV from the axis C. Adjacent first supportive curved sidewall projections 142 are spaced from each other a distance 143 selected to allow the outer pin link plates 124 to rest onto the first supportive curved sidewall projections 142 in a circular alignment relative to the common axis C Each of the two end portions 144 of each first supportive curved sidewall projection 142 curve in an outward direction relative to a radius RV defined from the common axis C. This is important in that the end portions 144 thus provide a structural means of impediment to movement of the outer pin link plates 124 rotationally about the common axis C along the chain array circle CC.

The end portions 144 of adjacent first supportive curved sidewall projections 142 are further connected by circumferential edges 146 generally aligned along the chain array circle CC. The outwardly curved end portions 144 and edges 146 thus prevent the chain ring gear 102 from rotating about the common axis C relative to the circular plate 101 and annular disc 103, and the first supportive curved sidewall projections 142 prevent the chain ring gear 102 from being compelled inwardly relative to the radius RV. Torque forces received by the roller chain 102 along the chain array circle CC and along the radius RV are also thereby translated into the circular plate 101 and annular disc 103.

Cylindrical pin recesses 147 are formed on surface faces 149 on both the circular plate 101 and annular disc 103. The recesses 147 are formed to create a clearance about the chain pins 128 once the roller chain 102 is in place on the link support structures 140 and 150. This enables the circular plate 101 and annular disc 103 faces 149 to engage the outer link plates 124 without engaging the chain pins 128, thereby enabling guidance of the roller chain 102 into proper alignment with the link support structures 140 and 150. In order to provide adequate clearance during operation of the gear system 100, it is preferred that the pin recesses 147 are aligned to share a common center point 161 with the roller chain pins 128 as assembled together, and it is important that the pin recesses 128 have a diameter 163 larger than the roller pin diameters to allow movement and outward flexion of the chain 102 without impedance from the circular plate 101 and annular disc 103 surface faces 149. In one embodiment, a pin recess diameter 163 value of about ⅜ inches (9.525 millimeters) is chosen for a ¼ inch (6.35 millimeters) diameter roller chain pin 128.

The roller chain 102 outer link plates 124 and inner link plates 126 are seated tightly within the link support structures 140 and 150 as assembled in the compound gearing system 100. More particularly, in operation of the compound gearing system 100, torque force transmission actually works to increase seating forces. Specifically, forces asserted by a planetary sprocket 104 at a given point of intersection 180 with the roller chain 102 are translated by the roller chain 102 into increased seating forces at an opposite point 182 along the roller chain 102 defined along a diagonal OD through the common central axis C.

The second support structure 150 is defined by a plurality of second supportive curved sidewall projections 152 that engage portions of the bottom inner surfaces 127 of the inner roller link plates 126 located within the chain array circle CC. The second supportive curved sidewall projections 152 are aligned to support the inner roller link plates bottom surfaces 127 in the circular chain alignment defined along the chain array circle CC as described above. The curved sidewall projections 152 provide a structural means of impediment to movement of the inner roller link plates 126 rotationally about the common axis C along the chain array circle CC, and also inwardly relative to the radius RV.

Rather than providing for connective edges similar to the first support sidewall edges 146, adjacent second supportive curved sidewall projections 152 are connected with common regions 154. The common regions 154 are aligned with middle regions 148 located at the middle of each of the first supportive curved sidewall projections 142. This alignment allows the outer pin link plates 124 to slide over the second support structures 150 and into position on the first support structures 140.

Thus, for the speed and torque translational operational purposes of the compound gearing system 100, the roller chain ring gear 102 is affixed to the circular plate 101 and annular disc 103 as an assembly, translating those torque force components acting upon the roller chain 102 in a rotational alignment about the central axis C and inwardly along a radius from the central axis C to the circular plate 101 and annular disc 103. However, what is also important in the present invention is that the profiles of the first and second support structures 140 and 150 substantially define a roller chain outline with the upper half of the "chain profile" removed to allow the chain to retain its normal stretching and shock resistive qualities. Thus, the roller chain 102 is thereby allowed to stretch and flex in the outward direction only. This allows the chain 102 to provide the advantages of roller chain, such as superior shock-absorbing, frictional and lubrication characteristics, within a compound gearing system, while still providing superior torque transfer properties in compound gearing arrangements not possible with prior art roller chain interfacing structures. Standard chain failure due to stretch is generally defined in the art as 1.5% elongation. This amount of stretch is accommodated by the present invention without resulting in the chain loosening from support structures or otherwise causing the compound gearing system to fail.

Rather, as described above, forces causing the chain 102 to flex outward at any given point will actually be translated into seating forces at a corresponding opposite point along the roller chain 102 as defined by a diagonal through the common central axis C. Therefore, in the present embodiment where four planetary sprockets 104 are distributed evenly about the central axis C, it is readily apparent that outward flexion of the roller chain 102 at a given point of sprocket interaction 180 will be opposed by compression forces translated through the roller chain 102 from a corresponding opposite point of sprocket interaction 182 generated by the opposite planetary sprocket 104. Accordingly, it is preferred in the present invention that the plurality of planetary sprockets 104 are arranged wherein each planetary sprocket 104 has a corresponding opposite planetary sprocket 104 array across from it along a diagonal through the central axis C.

Thus, the present invention provides a method and system for incorporating the advantages of roller chain into compound gearing systems in an efficient manner not possible under the prior art teachings. Is also important to note that although the present embodiment utilizes a "waisted plate" style of roller chain 102, the invention may be practiced with other styles of roller chain: one example would be a "straight plate" roller chain application (not shown). Thus, for a straight plate style of roller chain alternative first and second chain support structures (not shown) would generally define straight linear profiles in combination with the curved sidewall projections 142. However, one disadvantage of alternative straight first and second chain support structures formed for use with straight plate roller chain is that lacking the curved faces of the present first and second chain support structures 140 and 150 they provide lower frictional or structural resistance to radial or lateral movement of a roller chain, and are thus more susceptible to shearing of the curved sidewall projections 142 responsive to operational forces.

FIGS. 2A through 2D illustrate another embodiment 200 of the present invention. An annular chain-engaging disc ring 203 and chain-engaging circular element 201 are provided having chain link support structures 140, 149 and 150 as described above. However, in the present embodiment, annular ring 203 and circular element 201 are formed for engaging a double-stranded roller chain ring gear element 202. Specifically, the annular ring 203 link support structures 140 and 150 are formed to engage the outside outer pin link plates 274 and inner roller link plates 276, respectively, of a first roller chain strand 205, and the circular element 201 link support structures 140 and 150 are formed to engage the outside outer pin link plates 278 and inner roller link plates 280, respectively, of a second roller chain strand 207.

Sun input driving gear 208 drives the teeth 220 and 221 of four circumferentially spaced planetary double sprockets 204, wherein the first set of sprocket teeth 220 engage the first roller chain strand 205 and the second sprocket teeth 221 engage the second roller chain strand 207. Each of the planetary double sprockets 204 rotate about one of four circumferentially spaced pins 210, the pins fixed into an output disc body 212, which may, in turn, be connected to an output shaft (not shown). As the planetary double sprockets 204 are rotated by the driving gear 208, they responsively travel along the double chain inner ring gear 202.

The output disc body 212 is located and freely rotates within a circular aperture 205 defined by the annular ring 203. The double roller chain 202 is located between and fixed in position with respect to the annular ring 203 and circular element 201 by resting upon and interacting with the chain link support structures 140 and 150. The annular ring 203 and circular element 201 further define mounting apertures 230 for connection to other structural elements, such as the geared case housing (not shown) or an input motor casing (not shown), or for connective bolt elements 232 to connect the annular ring 203 and circular element 201 into a fixed structure about the chain gear 202.

Cylindrical pin recesses 147 are formed on surface faces 149 on both the annular ring 203 and circular element 201, and it is preferred that the annular ring 203 surface face 149 is spaced from and generally parallel to the outer second chain plates 278, and the circular element 201 surface face 149 is spaced from and generally parallel to the outer first chain plates 274 in order to avoid frictional interference with the movement of the double roller chain 202 during operation of the compound gear 200.

The annular ring 203 has a cylindrical inner sidewall 292 defined about normal to the inner surface 149 about the common central axis C, and formed to accommodate the second chain strand 207. The annular ring sidewall 292 is spaced from the second chain strand 207 and has a depth value 293 greater than the second chain strand 207 width. The circular element 201 has a cylindrical inner sidewall 290 defined about normal to its inner surface 149 about the common central axis C formed to accommodate the first chain strand 205. The circular element sidewall 290 is spaced from the first chain strand 205 and has a depth value 291 greater than the first chain strand 205 width.

What is important in the present invention is that each of the pairs of chain-engaging structural elements (e.g. the annular disc 103 and circular plate 101 pair, and the circular element 201 and disc ring 203 pair) are fixed into position with respect to each other such that the chain link support structures 140 and 150 located on opposite sides of the roller chains 102 and 202 are spaced tightly about and engaging the roller chains 102 and 202. A preferred spacing tolerance is about 0.001 inches (0.0254 millimeters) greater than the width of the roller chains 102 and 202 so engaged.

By forming the first and second support structures 210 and 220 through machining into suitable gearing materials, the structures 210 and 220 provide sufficient interference such that destruction of the chain itself will occur prior to damaging of the holding profiles defined by the structures 210 and 220. A significant advantage of the present invention is that the circular structure element 101 and structures 210 and 220 may be formed from aluminum, resulting in superior materials and machining costs savings, and in weight efficiencies and performance.

In a first example, an aluminum circular element 201 and disc ring 203 were fabricated for use with a standard roller chain and incorporated into a planetary compound gearing system unit 200 with ½ inch (1.27 centimeter) pitch, compound chain ring gear 202 pitch count value of 30, driver 208 pitch count value of 10, and planetary sprocket 204 pitch count value of 12. Static torque was applied to the unit, with the unit able to withstand 7,000 in-lbs. of torque. Disassembly and inspection of the unit revealed no damage or signs of wear on chain link support structures. In one case, a ¾ inch (1.905 centimeter) diameter shaft used for transferring the torque to the test unit failed. In a second incident, two coincident planet teeth from one of the double planet sprockets experienced catastrophic failure at the root (thickest portion of the tooth profile).

In a second example, similar experiments were conducted on a steel circular element 201 and disc ring 203 in a planetary compound gearing system unit 200 fabricated to similar dimensions as described in the above first example. Disassembly and inspection of the unit revealed that significant deformation on the surface of the chain rollers occurred at 8,000 in-lbs., without damage to the chain support structures.

It is believed that proper fit of the chain into the support structures 210 and 220 is important to ensure that no wear or damage is caused to the structures 210 and 220, due to the fact that a proper fit ensures an equal distribution of load. Preferred tolerances between the roller chain and the structures 210 and 220 according to the present invention are about 0.001 inches (0.0254 millimeters).

Another benefit of the present invention is the fact that for a single stage of planets, only a single strand of chain is required for the system to operate. Thus, only a double strand chain is required to produce a two stage system; a three strand chain can produce a three stage system, etc.

Figure 3A:
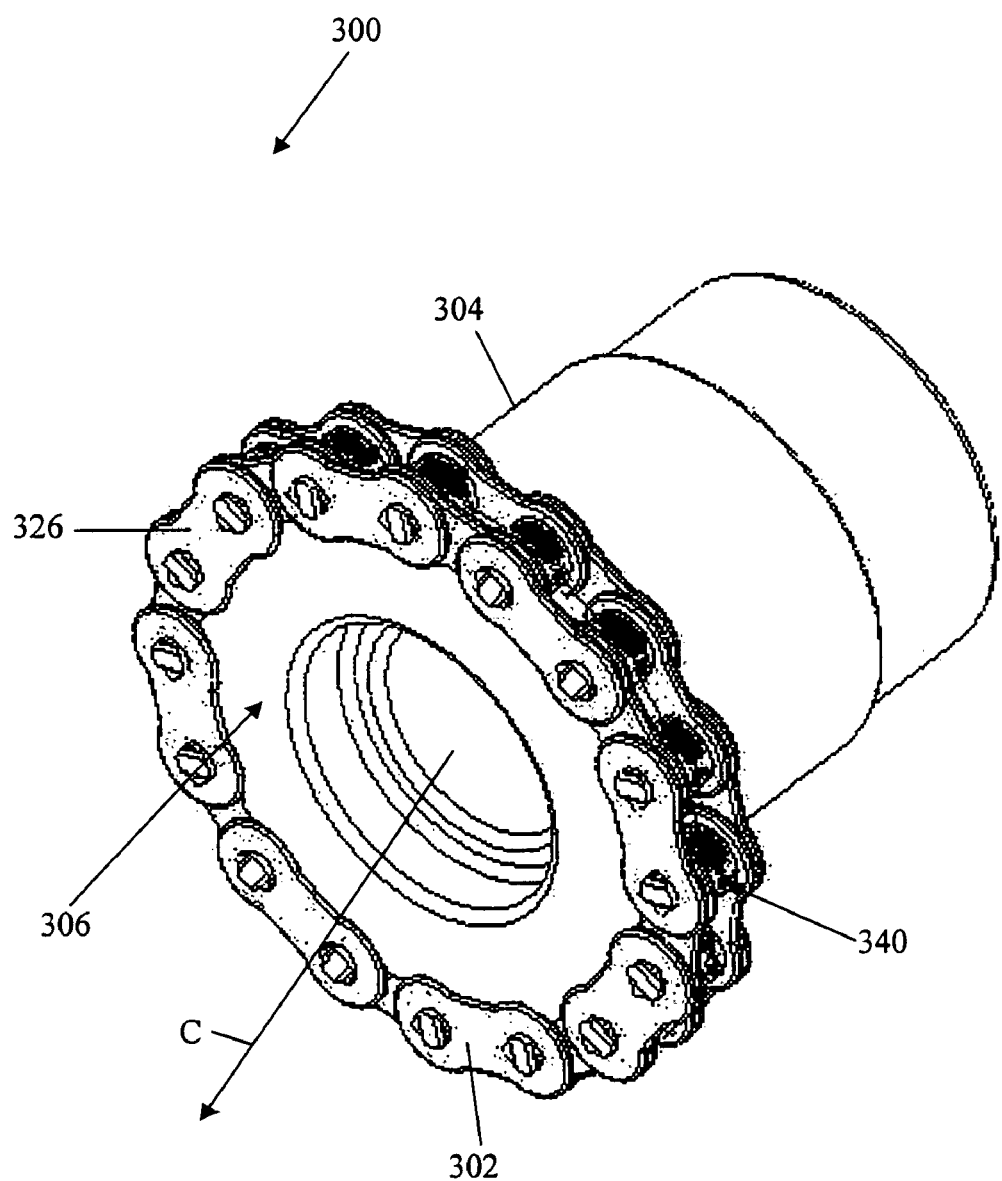
FIG. 3A is a perspective view of another composite gear system according to the present invention.
Figure 3B:
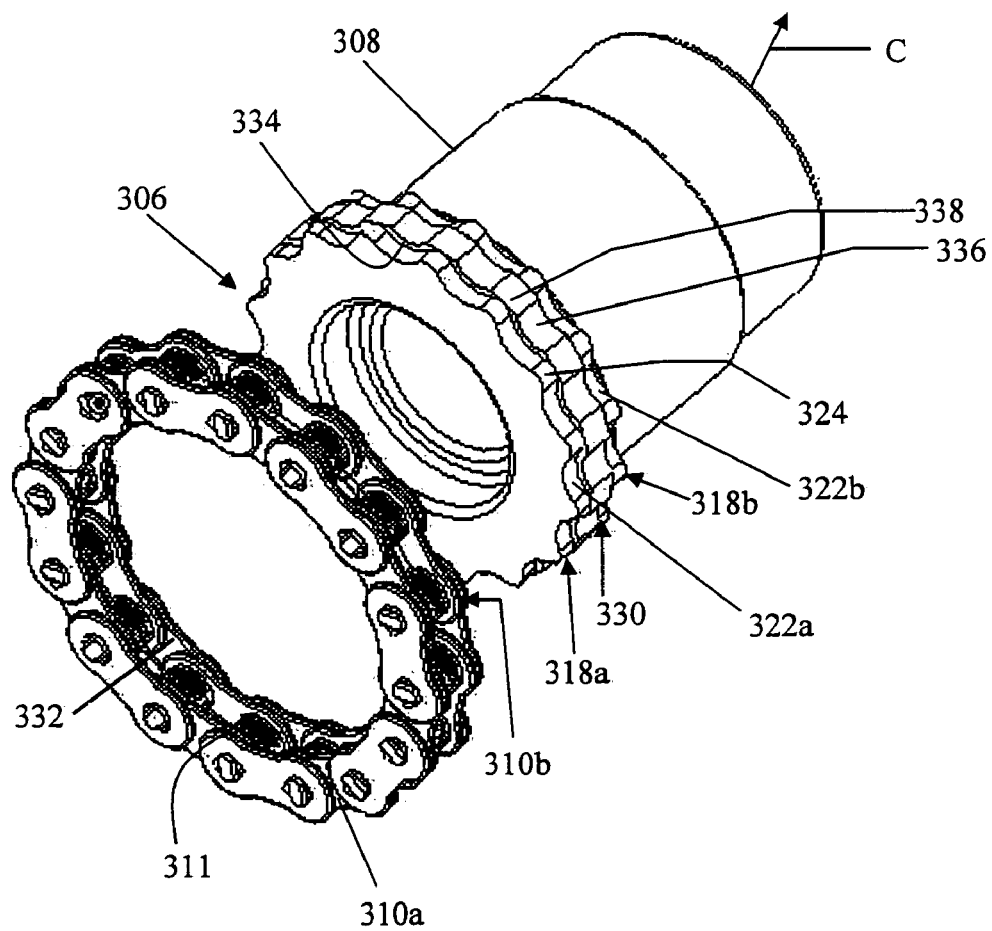
FIG. 3B is an exploded view of the composite gear system of FIG. 3A.

Referring now to FIGS. 3A and 3B, another-embodiment of the present invention 300 is shown which is especially suitable for external gearing applications. Here a single-strand roller chain 302 is fixed into position about a driver element 304. The resulting compound driver 300 is suitable for many applications. For example, it may be used in place of the solid sun gear 108 of the compound gearing embodiment 100 illustrated in FIGS. 1A through 1D.

The compound gear 300 includes a circular disk 306 which has a shaft 308 connected thereto for rotation thereof. A pair of slots 318a and 318b are formed in the outer peripheral surface of the disk 306 about a central projection 330 to correspond to the shapes of the inner roller link plates 310a and 310b, respectively, of the roller chain 302. The slots 318 have a plurality of valley regions 322 in which the inner round ends 311 of the inner roller link plates 310 are firmly seated. The adjacent valleys 322 are joined by rounded tops 324 formed to conform to the shape of the outer pin link plates 326, yet remain spaced from them. In one embodiment of the present invention where the outer pin link plates 326 are about ¼ inches (6.35 millimeters) tall and 9/16 inches (1.43 centimeters) long, the valleys 322 and rounded tops 324 are spaced about 1/32 inches (0.79 millimeters) from the outer pin link plates 326.

The central projection 330 comprises outer walls 334 formed to contact the inside surfaces 332 of each of the inner roller link plates 310, thereby holding the roller chain 302 in a fixed position along the central axis C of the compound gear 300. It is also important that the central projection 330 not interfere with the operation of the chain rollers 340. Accordingly, the top of the central projection 330 has a plurality of roller-valleys 336 conforming to and spaced from the roller chain rollers 340. Adjacent roller valleys 336 are connected by top regions 338, formed with a low profile so as not to interfere with either the chain rollers 340 or the teeth of a sprocket gear (not shown) engaging the compound gear 300 by interfacing with the roller chain 302.

The compound gear 300 is preferably formed by selecting a section of roller chain 302 having a number of chain rollers 340 corresponding to the number of sets of valleys 322a-336-332b formed on the circular disk 306, reeving the section of roller chain 302 around the circular disk 306 and then fastening the ends of the roller chain section about the circular disk 306, thereby firmly seating the inner roller link plates 324 into the slots 318.

It is important that the roller chain 302 is tightly reeved about the circular disk 306. Accordingly, the mounting slots 318 must conform closely to the shape of the inner roller link plates 310 as reeved about the circular disk 306, and preferred tolerances between the alignment of the slot valleys 322 and the inner plate round ends 311, and between the alignment of the central projection 330 outer walls 334 and the inner roller link plate inside surfaces 332 is in the neighborhood of 0.001 inches (0.0254 millimeters). The roller chain 302 is, thus, held firmly in position upon and transfers torque forces to the circular disk 306 through interaction with the inner roller link plates 324, while providing for full unimpeded access to the chain rollers 340 by a sprocket gear element (not shown), wherein the rollers remain free to rotate within the roller chain 102. Thus, the full advantages of roller chain are provided in alignment typical of a solid gear, without compromising roller chain access or performance as was required in the prior art.

Figure 9:
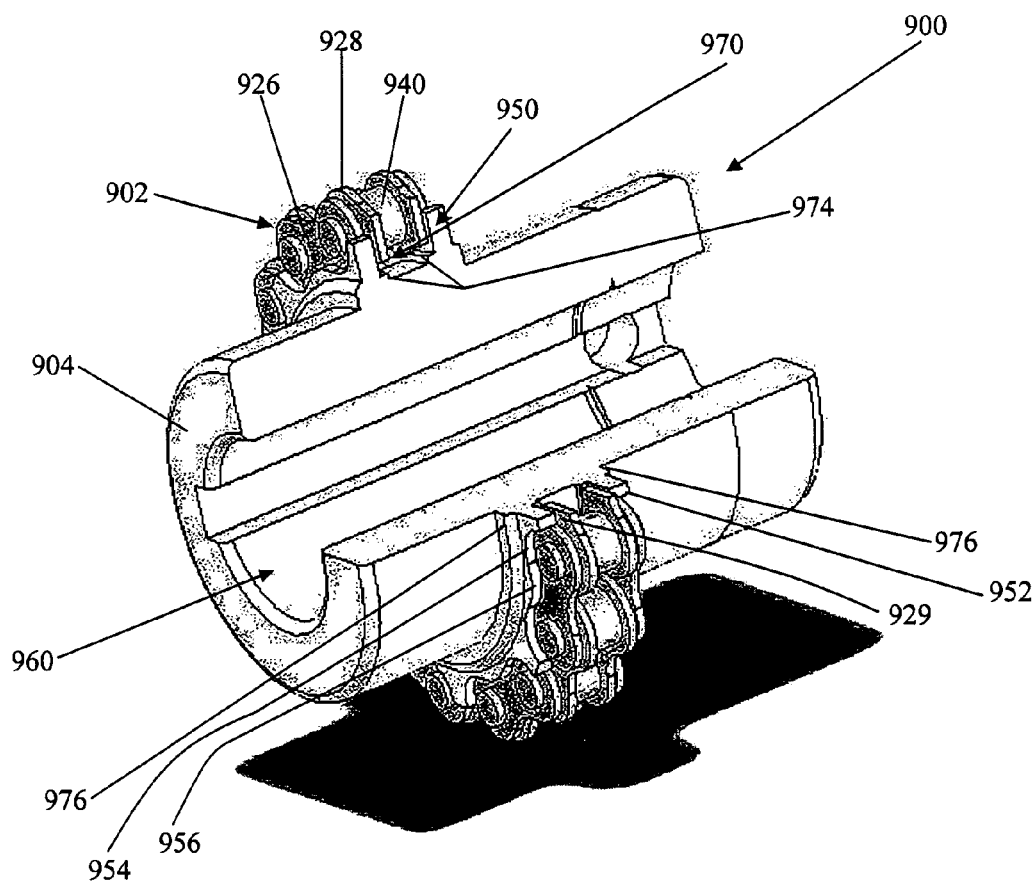
FIG. 9 is a perspective and partially sectional view of another composite gear system according to the present invention.
Figure 10:
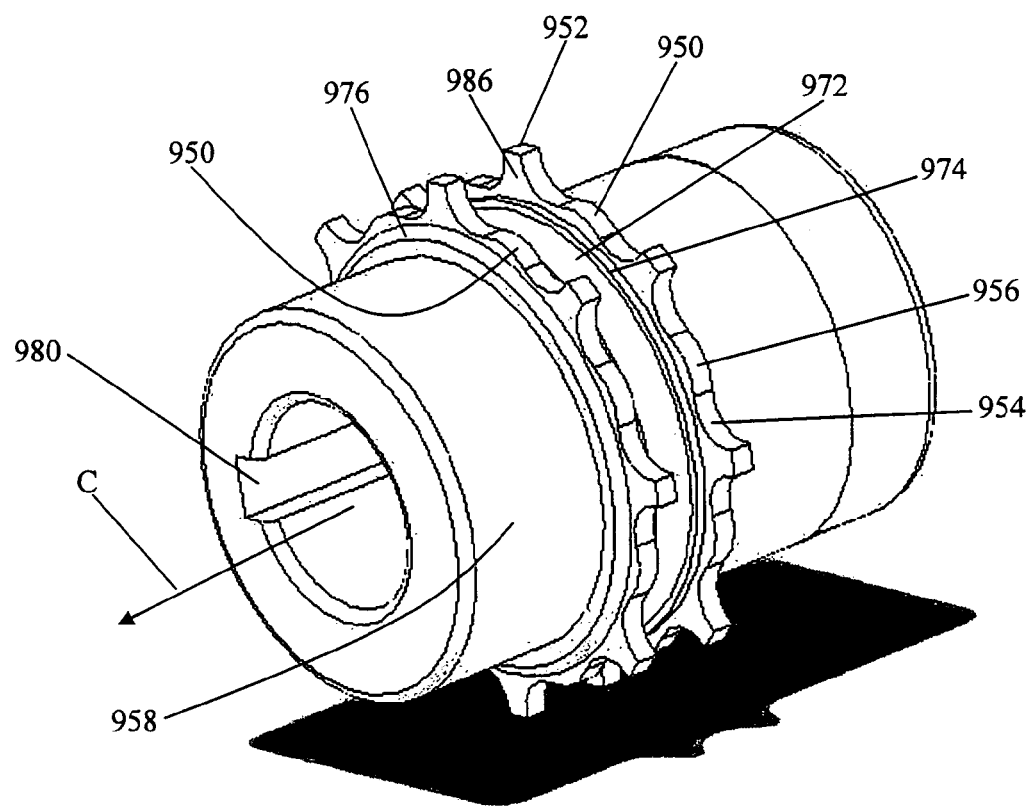
FIG. 10 is a perspective view of a gear component of the system of FIG. 10.

Referring now to FIGS. 9 and 10, another embodiment of the present invention 900 is shown which is also especially suitable for external gearing applications. A single-strand roller chain 902 is fixed into position about a driver element 904, providing the resulting compound driver 900 is suitable for many applications, including as a sun gear in place of the solid sun gear 108 of the compound gearing embodiment 100 illustrated in FIGS. 1A through 1D. The compound gear 900 comprises a cylindrical shaft body 958 defining a central mounting aperture 960; the present embodiment features a key-way slot 980 formed for attachment to a motor shaft, however other mounting structures may be practiced with the present invention as will be readily apparent in one skilled in the machining arts.

A pair of parallel outer chain link support structures 950- is formed on outer surface of the shaft body 958 to correspond to the shapes of and mate with the outer roller link plates 926 of the roller chain 902. The outer chain link support structures 950 are defined by a plurality of supportive curved sidewall projections 954 that engage substantially the entire curved bottom half of each outer pin link plate 926, in a fashion similar to that described above with respect to the embodiment shown in FIGS. 1A-1D. Adjacent supportive curved sidewall projections 954 are spaced from each by transitional curves 956, and end portions 952 curve in an outward direction: this is important in that the end portions 952 thus provide a structural means of impediment to movement of the outer pin link plates 926 rotationally about the common axis C.

What is new in the present embodiment is a pair of inner cylindrical shoulders 974 are provided inside the outer chain link support structures 950. The shoulders 974 provide circumferentially support for the bottom surfaces of the roller chain inner plates 928, thus assisting in assuring a radial alignment of the roller chain 902 about the cylincfrical gear element 904 and also providing structural support resistant to forces directed inward along radial directions upon the roller chain 902 as translated by or experienced directly by the inner chain plates 928. And additionally, opposing inner surfaces 986 of each of the outer chain link support structures 950 provide structural resistance against axial movement of the roller chain 902 about the gear element 904 with respect to the central axis C, by interfacing with the outer surfaces 929 of the roller chain inner chain plate 928 and thereby restricting the chain 902 from moving axially.

Torque forces received by the roller chain 902 from engagement with a sprocket gear (not shown) are thereby translated to the gear structure 904 through the profile-fitting support structures 950 through only the outer chain link plates 926: thus the present embodiment fonns a compound gear structure 900 with the roller chain 902 without requiring similar form-fitting structures for the inner chain link plates 928.

It is also important that the gear element 904 not interfere with the operation of the chain rollers 940. In another advantage of the present embodiment of the invention the cylindrical inner link support shoulders 974 are disposed about an inter-region surface 972 configured to be spaced a clearance distance 970 from the roller chain rollers 940 in order to assure free spinning of the rollers 940 without interference from the gear body 904. In a further advantage of the present invention the inter-region surface 972 may be configured a sufficient clearance distance 970 from the rollers 940 that sprocket teeth (not shown) engaging the roller chain rollers 940 will not impact or interact with the gear element 904 surface defined in the inter-region 974, thus providing additional operational benefits readily apparent to one skilled in the arts.

It is important that the roller chain 902 is tightly reeved about the gear structure 904. Accordingly, the outer chain link support structures 950 must conform closely to the shape of the outer roller link plates 926 as reeved about the gear structure 904, and preferred tolerances between the alignment of the outer chain link support structures 950 and the outer roller link plates 926 is in the neighborhood of 0.001 inches (0.0254 millimeters). The roller chain 902 is, thus, held firmly in position upon and transfers torque forces to the gear structure 904 through interaction with the outer roller link plates 926, while providing for full unimpeded access to the chain rollers 940 by a sprocket gear element (not shown), wherein the rollers 940 remain free to rotate within the roller chain 902. Thus, the full advantages of roller chain are provided in alignment typical of a solid gear, without compromising roller chain access or performance as was required in the prior art.

Figure 4:
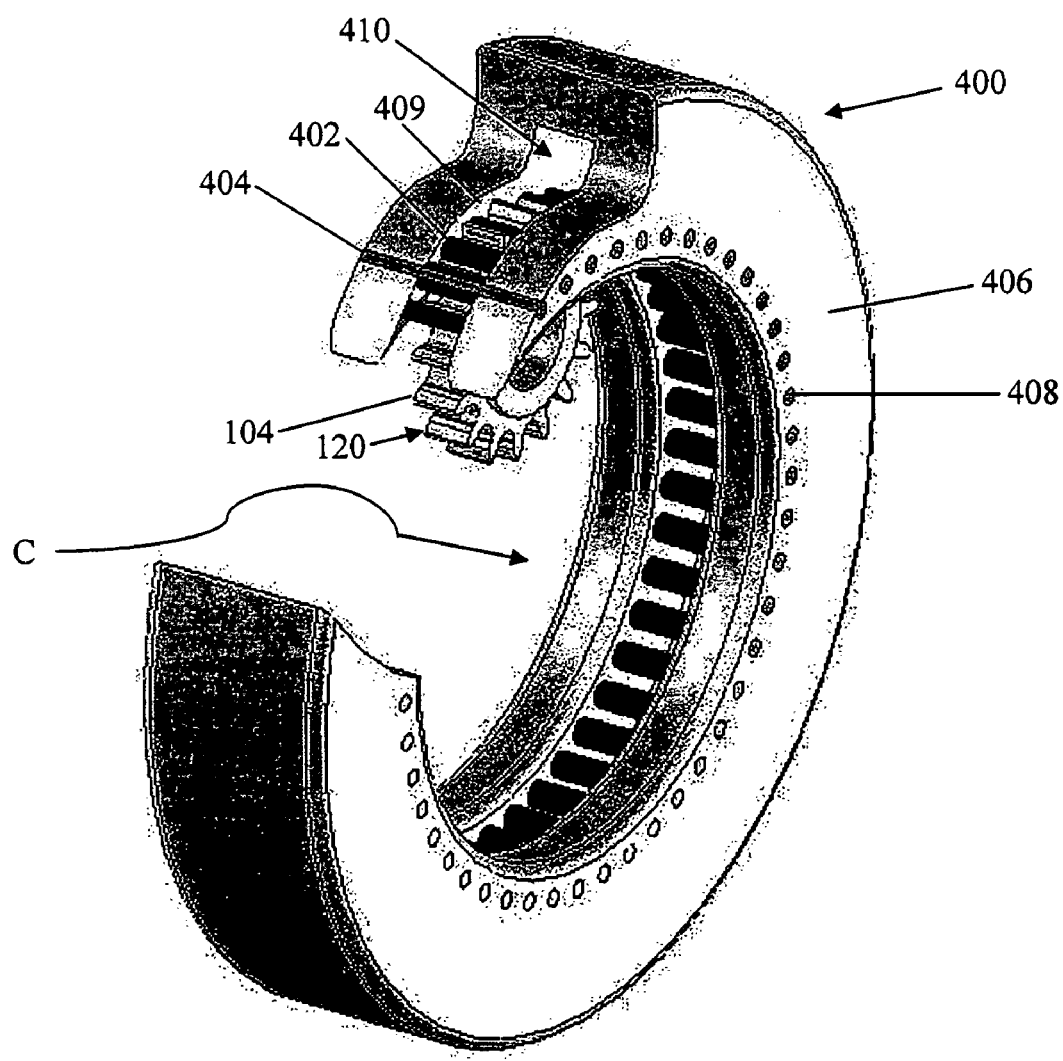
FIG. 4 is a perspective and partially sectional view of another gear set component according to the present invention.

The present inventions may incorporate other chain-type or roller-type components. FIG. 4 illustrates an alternative pin roller ring gear structure 400 according to the present invention. The pin roller structure 400 may replace the ring gear 102/circular plate 101 structure of the embodiment illustrated in FIGS. 1A through 1D, and thereby be incorporated into and understood generally in correlation with the description of that embodiment. More specifically, the planetary sprockets 104 rotated by the driving gear 108 may responsively travel through interaction of the sprocket teeth 120 along a plurality of rollers 402 arrayed about the central axis C, each roller 402 rotatably fixed onto a plurality of pins 404 affixed to a generally cylindrical housing 406 defined about the central axis C.

The roller pins 404 are fixed into pin apertures 408 formed in the cylindrical housing 406. Cylindrical housing inner walls 409 further define a roller accommodation aperture 410 formed to allow unimpeded access to the rollers 402 by the planetary sprocket 104 sprocket teeth 120. The inner walls 409 are spaced a dimension larger than the length of the rollers 402, enabling the rollers 402 to freely rotate about the roller pins 404 during sprocket tooth 120 engagement. Thus, the present embodiment may also provide the same economies of overall width dimension as the single roller chain ring gear 102 of the embodiment of FIG. 1A through 1D.

Figure 5:
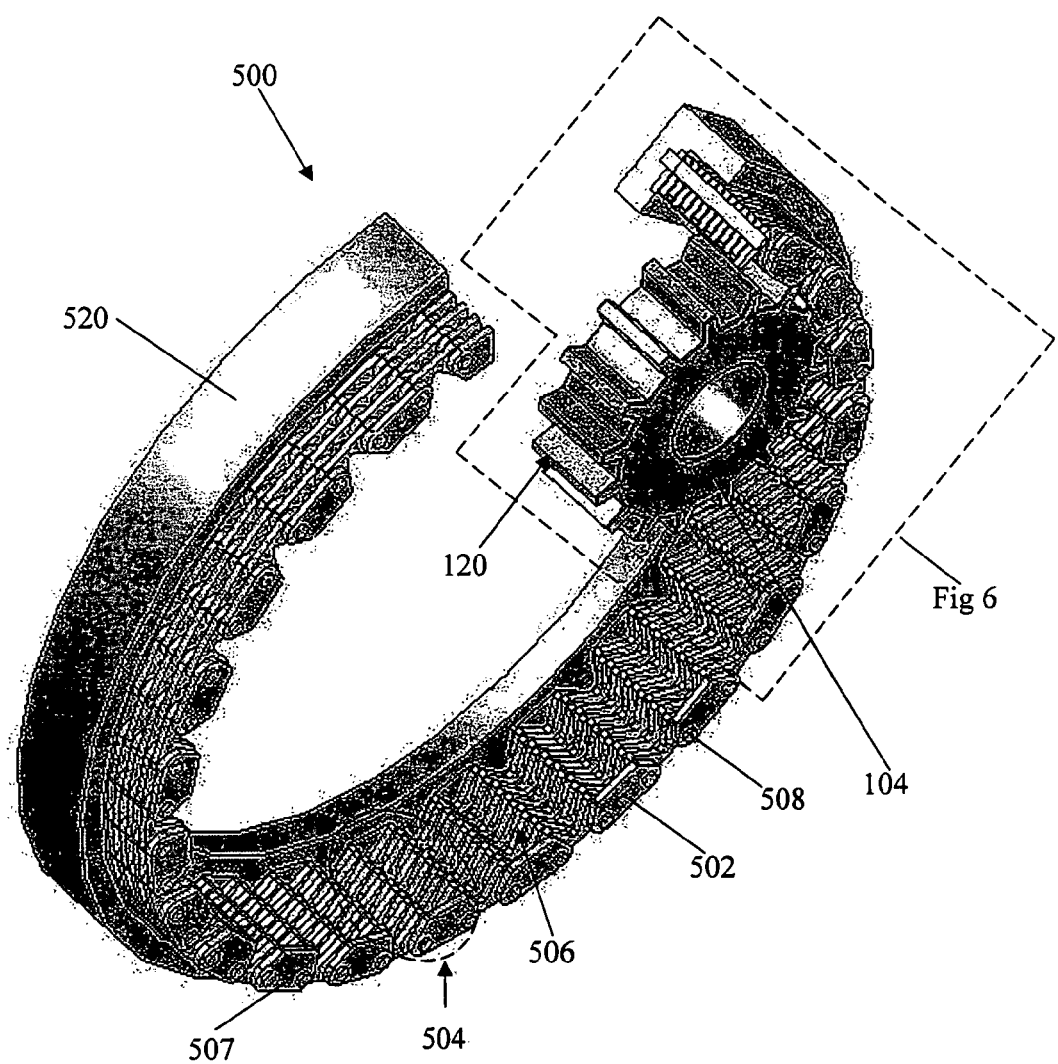
FIG. 5 is a perspective and partially sectional view of another gear set component according to the present invention.
Figure 6:
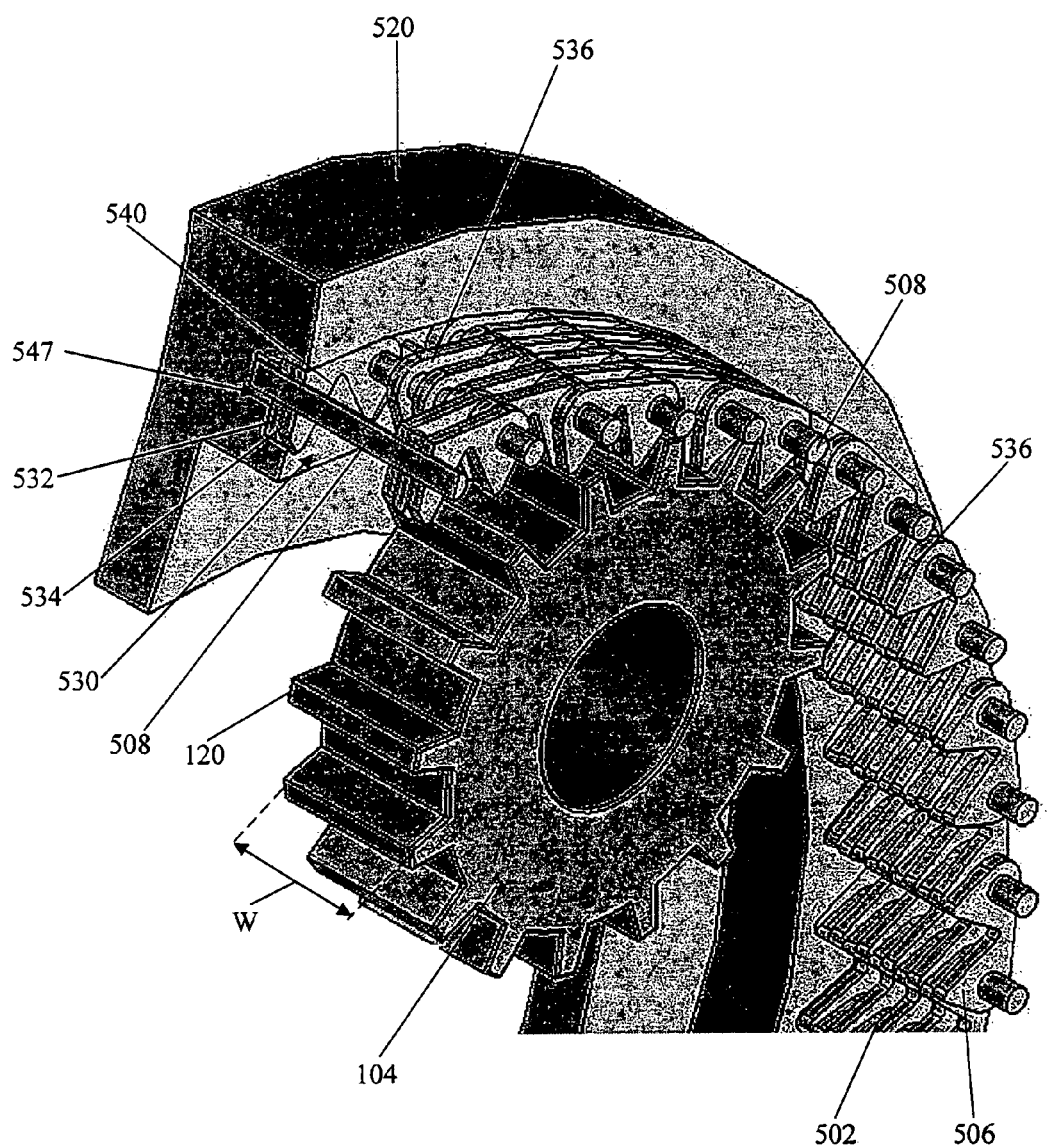
FIG. 6 is a detail view of a portion of the gear set component of FIG. 5.

FIGS. 5 and 6 illustrate an alternative silent chain ring gear structure 500 according to the present invention. This embodiment may also be understood to replace the ring gear 102/circular plate 101 structure of the embodiment illustrated in FIGS. 1A through 1D, and thereby be incorporated into and understood generally in correlation with the description of that embodiment. More specifically, planetary sprockets 104 rotated by the driving gear 108 may responsively travel through interaction of the sprocket teeth 120 along a "silent" or "inverted-tooth" chain. As is commonly known in the art, the silent chain 502 is defined by a plurality of links 504. Each link 504 is defined by a plurality of tooth plates 506 located between endplates 507, the tooth plates 506 and endplates 507 pivotably attached to each other by meshing ends of the tooth plates 506 and endplates 507 and inserting silent chain pins 508 there through. The overall width dimension of the silent chain 502 can be varied by varying the number of tooth plates 506 in each link 504.

What is new and important in the present invention is a system and method for fixing the silent chain 502 in position with respect to the cylindrical silent chain housing structure 520. Link support structures 530 are formed on the silent chain housing structure 520 for engaging the tooth plates 506 to thereby hold the silent chain 502 in a fixed position with respect to the silent chain housing structure 520. What is additionally important is that the link support structures 530 are also formed so that they engage each of the outermost adjacent tooth plates 532 and 534 of adjoining links 504. This allows unimpeded access to the remaining inner tooth plates 536 by the sprockets 104. Accordingly, two silent chain housing structures 520 attached together about a silent chain 502 are configured to space their respective link support structures 530 a spacing dimension wider than the width W of the sprocket teeth 120.

According to the present invention, the link support structures 530 comprise tooth support walls 540 which are formed on silent chain housing structure 520 to mate with the outermost adjacent tooth plates 532 and 534 and, more specifically, with the bottom inner surfaces 536 of the outermost adjacent tooth plates 532 and 534.

What is important is that the present invention utilizes the outermost adjacent tooth plates 532 and 534 of conventional silent chain 502 to hold the chain in place as a ring or planet gear, thereby enabling unfettered access to the inner tooth plates 536 from the planetary sprocket teeth 120. It is preferred that the link support structures 530 are formed as profiles substantially identical to those of portions of the bottom areas 536 of the outermost adjacent tooth plates 532 and 534, thereby utilizing the outermost adjacent tooth plates 532 and 534 both to transmit torque and to fix the silent chain 502 into position with respect to the silent chain housing structure 520 by restraining the roller-silent chain 502 from moving inwardly or rotationally with respect to the common center axis C.

Cylindrical pin recesses 547 are also formed on the silent chain housing structure 520. The recesses 547 are formed to create a clearance about the silent chain pins 508 This enables the silent chain housing structure 520 to engage the outermost adjacent tooth plates 532 and 534 without engaging the silent chain pins 508, thereby enabling guidance of the silent chain 502 into proper alignment with the link support structures 530.

The outermost adjacent tooth plates 532 and 534 are generally seated tightly within the link support structures 530. More particularly, in operation of the compound gearing system, torque force transmission actually works to increase seating forces. Specifically, forces asserted by a planetary sprocket 104 at a given point of intersection with the silent chain 502 are translated by the silent chain 502 into increased seating forces at an opposite point along the silent chain 502 defined along a diagonal through the common central axis C.

What is also important in the present invention is that the link support structures 530 substantially define a silent chain outline with the upper half of the "chain profile" removed to allow the chain to retain its normal stretching and shock resistive qualities. Thus, the silent chain 502 is thereby allowed to stretch and flex in the outward direction only. This allows the silent chain 502 to provide all of the general advantages of silent chain, such as superior shock-absorbing, frictional and lubrication characteristics, within a compound gearing system, while still providing superior torque transfer properties in compound gearing arrangements not possible with prior art silent chain interfacing structures.

Figure 7:
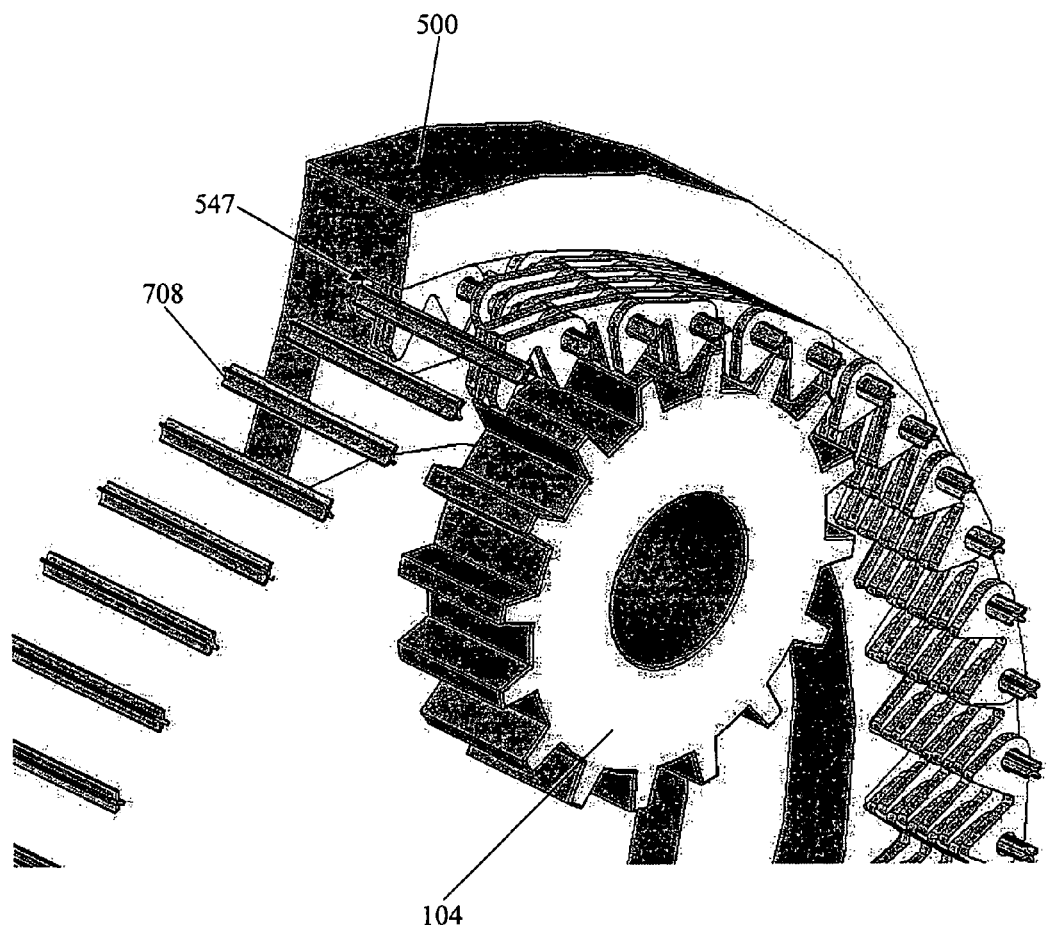
FIG. 7 is a detail view of a portion of the gear set component of FIG. 5 incorporating an alternative chain component.

FIG. 7 illustrates an alternative silent chain 700 incorporating a non-cylindrical chain pin 708 as accommodated by the silent chain housing structure 520 of FIGS. 5 and 6.

Figure 8A:
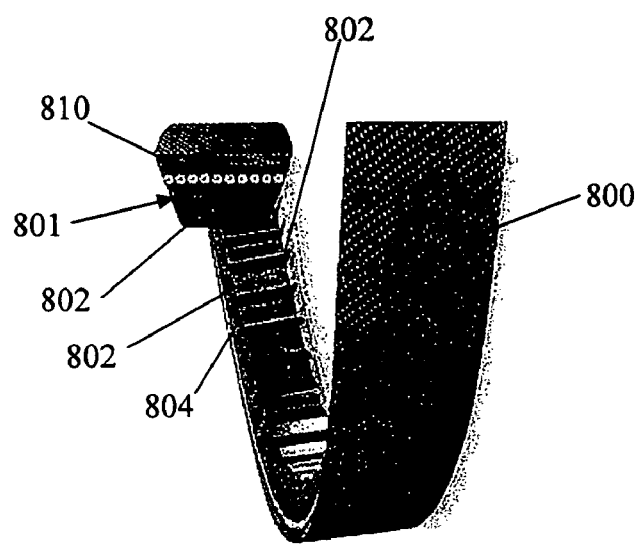
FIGS. 8A through 8C are a series of perspective and partially sectional views of exemplary cog belts appropriate for use with the present invention.

It will also be apparent to one skilled in the art that the structures and methods according to the present invention described thus far may incorporate cog belts as single-strand ring gear elements. FIG. 8A provides a view of a conventional solid tooth cog belt 800. Solid tooth cog belts are generally formed with molded neoprene rubber compound cogs 801 attached to a fabric or corded outer belt structure 810, such as the Gold Ribbon® Cog-Belt® made by Carlisle Power Transmission Products, Inc. Cog support structures may be provided according to the present invention, similar to the roller chain support structures 140 and 150 and the silent chain link support structures 530 described above, adapted to engage outer regions 802 of the solid cogs 801. Support structures would be spaced apart sufficient to expose central cog regions 804 for engagement with planetary sprocket teeth or other gear tooth structures, as generally described above.

Figure 8B:
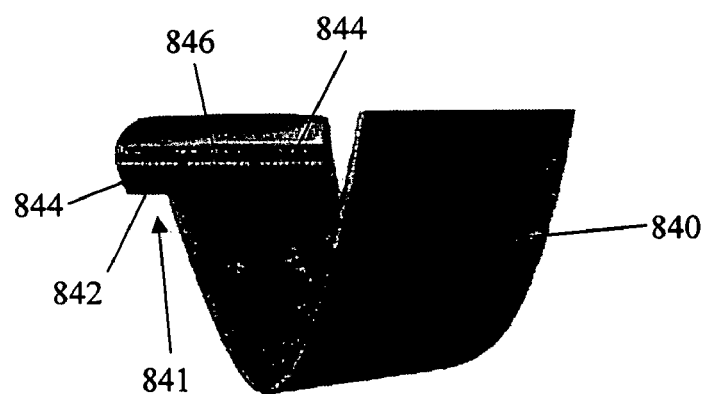
Figure 8C:
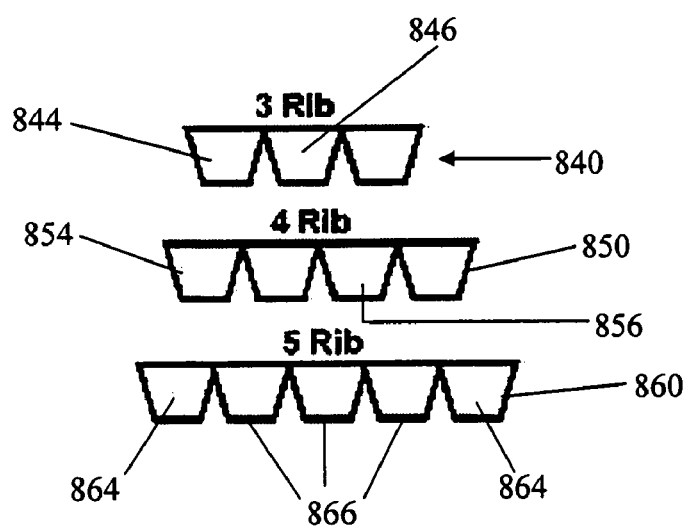

FIGS. 8B and 8C provide views of a conventional multi-rib cog belt 840. The multi-rib cog belt 840 has sets of three adjacent cog tooth ribs 842 defining compound cogs 841. Cog support structures may be provided according to the present invention, similar to the roller chain support structures 140 and 150 and the silent chain link support structures 530 described above, adapted to engage outer cog ribs 844, and spaced apart sufficient to expose the central cog rib 846 for engagement with planetary sprocket teeth or other gear tooth structures, as generally described above.

In the same fashion, multi-rib cog belts with other rib multiples may be accommodated. Referring now to FIG. 8C, cog support structures may be provided according to the present invention, similar to the roller chain support structures 140 and 150 and the silent chain link support structures 530 described above, adapted to engage outer cog ribs 854 of a four-rib multi-rib cog belt 850, spaced apart sufficient to expose the two central cog ribs 856 for engagement with planetary sprocket teeth or other gear tooth structures, or also adapted to engage the outer cog ribs 864 of a five-rib multi-rib cog belt 860, and spaced apart sufficient to expose the three central cog ribs 866 for engagement, as generally described above.

While several embodiments of this invention have been shown and described, various adaptations and modifications can be made without departing from the scope of the invention as defined in the appended claims.

What is claimed is:

1. A compound gear system, comprising:
a flexible gear comprising an articulating linear array of inner and outer gear elements disposed about middle gear tooth-engaging elements, the inner and outer gear elements each defining bottom profile regions; and
a cylindrical rigid structure comprising spaced parallel ring arrays of first and second gear support structures projecting outward relative to a center axis, the first support structures each projecting an outward surface profile having sidewall ends, the first outward profiles conforming to one of the inner and outer gear element bottom profiles, and the second gear support structures each projecting an outward surface profile conforming to an other of the inner and outer gear element bottom profiles, the arrays spaced by a spacing distance greater than a tooth width of each of a plurality of gear teeth of a sprocket gear configured to engage the middle gear tooth-engaging elements;
wherein the flexible gear is reeved tightly about the first support structures relative to the center axis and engaging the first support surface profile, the first support surface profile thereby restraining an engaged one of the inner and outer gear elements from moving inwardly relative to the center axis and the first gear sidewall ends, thereby restraining the engaged one of the inner and outer gear elements from moving rotationally relative to the center axis, the second gear outward profile surface aligning in conformance to an other of the inner and outer gear element bottom profiles, the gear support structures allowing the flexible gear to expand outward relative to the center point; and
wherein the support structures are configured to transmit torque between the engaged flexible gear elements and the rigid structure responsive to interaction of the flexible gear middle tooth-engaging elements with said sprocket gear teeth disposed between the spaced gear support structure ring arrays and engaging the middle gear tooth-engaging elements.

2. The compound gear system of claim 1, wherein the flexible articulating gear is a roller chain defining a sun gear array about the cylindrical rigid structure and the middle gear tooth-engaging elements are chain rollers, wherein the rigid structure further comprises an inter-region surface located between the spaced support arrays and spaced a clearance distance from the chain rollers selected so that sprocket teeth engaging the chain rollers from outside of the sun gear array will not interact with the inter-region surface.

3. The compound gear system of claim 1, wherein the flexible gear elements are connected to each other by and articulate about connective pins, the pins having a maximum pin cross section width dimension and first and second ends, the pin first ends projecting beyond first outer flexible gear element side walls and the pin second ends projecting beyond second outer flexible gear element side walls; and
wherein the rigid structure defines circular apertures for receiving the pin first ends and pin second ends, the circular apertures having a diameter greater than a sum of the maximum pin cross section width dimension and a flexible gear expansion tolerance dimension.

4. The compound gear system of claim 1 wherein the flexible gear is at least one roller chain, the inner gear elements are inner chain plates, and the outer gear elements are outer chain plates.

5. The compound gear system of claim 4 wherein the first structures are spaced no more than 0.0254 millimeters (0.001 inches) from the engaged inner or outer plates.

6. The compound gear system of claim 4 wherein the flexible gear is a composite roller chain formed from a plurality of individual parallel roller chains.

7. The compound gear system of claim 1 wherein the flexible gear is a silent chain comprising parallel pluralities of link plates connected rotatably about silent chain pins.

8. The compound gear system of claim 1 wherein the flexible gear is a cog belt.

9. A method for compound gearing, comprising:
providing a flexible gear comprising an articulating linear array of inner and outer gear elements disposed about middle gear tooth-engaging elements, the inner and outer gear elements each defining bottom shaped regions;

reeving the flexible gear tightly about a rigid cylindrical structure comprising spaced parallel ring arrays of first and second gear support surfaces oriented outward relative to a center axis, the first gear support surface comprising a profile shape surface having sidewall ends projecting outward relative to the center axis and conforming to one of the inner and outer gear element bottom shaped regions, and the second gear support surface comprising a profile aligning in conformance to an other of the inner and outer gear element bottom shaped regions, the arrays spaced by a spacing distance greater than a tooth width of each of a plurality of gear teeth of a sprocket gear configured to engage the middle gear tooth-engaging elements;

the engaged first gear support structure profile shape surfaces restraining the engaged one of the inner and outer gear elements from moving inwardly relative to the center axis;

the engaged first gear support structure sidewall ends restraining the engaged one of the inner and outer gear elements from moving rotationally relative to the center axis;

the gear support structures allowing the flexible gear to expand outward relative to the center point; and wherein the gear support structures are configured to transmit torque between engaged flexible gear elements and the rigid structure responsive to interaction of the flexible gear middle tooth-engaging elements with said sprocket gear teeth disposed between the spaced gear support structure ring arrays and engaging the middle gear tooth-engaging elements.

10. The method of claim 9, further comprising the steps of:
the support structures defining first and second parallel circular arrays about an exterior of the cylindrical rigid structure, an inter-region surface area interposed there between; and spacing middle gear tooth-engaging chain rollers from the inter-region surface by a clearance distance selected wherein gear teeth engaging the chain rollers will not contact the inter-region surface area.

11. The method of claim 9, wherein the flexible gear elements are connected to each other by and articulate about connective pins having a maximum pin cross section width dimension and first and second ends, the pin ends projecting beyond outer gear element side walls; and defining apertures in the rigid structure for receiving the pin first ends and pin second ends.

12. The method of claim 9, further comprising the step of spacing the first structures no more than 0.0254 millimeters (0.001 inches) from the engaged ones of the inner and outer gear elements.

* * * * *